United States Patent
Mendez et al.

(10) Patent No.: US 8,809,798 B2
(45) Date of Patent: Aug. 19, 2014

(54) METHODS TO ENHANCE NUCLEAR SPECTROSCOPY ANALYSIS

(71) Applicants: Freddy E. Mendez, Kingwood, TX (US); Gary A. Feuerbacher, Humble, TX (US); John M. Longo, Houston, TX (US); Maxim Vasilyev, The Woodlands, TX (US)

(72) Inventors: Freddy E. Mendez, Kingwood, TX (US); Gary A. Feuerbacher, Humble, TX (US); John M. Longo, Houston, TX (US); Maxim Vasilyev, The Woodlands, TX (US)

(73) Assignee: Baker Hughes Incorporated, Houston, TX (US)

( * ) Notice: Subject to any disclaimer, the term of this patent is extended or adjusted under 35 U.S.C. 154(b) by 218 days.

(21) Appl. No.: 13/739,448

(22) Filed: Jan. 11, 2013

(65) Prior Publication Data

US 2014/0197324 A1  Jul. 17, 2014

(51) Int. Cl.
   *G01T 1/00* (2006.01)
(52) U.S. Cl.
   USPC .................................................. 250/395
(58) Field of Classification Search
   USPC .................................................. 250/358
   See application file for complete search history.

(56) References Cited

U.S. PATENT DOCUMENTS

| | | | |
|---|---|---|---|
| 3,930,154 A | 12/1975 | Scott | |
| 4,585,939 A | 4/1986 | Arnold et al. | |
| 4,857,729 A * | 8/1989 | Gadeken et al. | 250/260 |
| 4,939,361 A | 7/1990 | Smith, Jr. et al. | |
| 5,369,578 A | 11/1994 | Roscoe et al. | |
| 5,410,152 A | 4/1995 | Gadeken | |
| 6,389,367 B1 | 5/2002 | Plasek | |
| 6,927,390 B2 | 8/2005 | Mickael | |
| 7,398,159 B2 | 7/2008 | Venkataramanan et al. | |
| 7,408,645 B2 | 8/2008 | DiFoggio | |
| 7,511,819 B2 | 3/2009 | DiFoggio | |
| 7,538,319 B2 | 5/2009 | Jacobi et al. | |
| 7,718,956 B2 | 5/2010 | Ferguson | |
| 7,964,851 B2 * | 6/2011 | Fehrenbacher | 250/370.07 |
| 2004/0000645 A1 * | 1/2004 | Ramsden et al. | 250/361 R |
| 2008/0083872 A1 | 4/2008 | Huiszoon | |
| 2010/0312479 A1 | 12/2010 | Khisamutdinov et al. | |
| 2011/0049345 A1 | 3/2011 | Roberts | |
| 2011/0144913 A1 | 6/2011 | Klein et al. | |
| 2012/0046867 A1 * | 2/2012 | Faber et al. | 702/8 |
| 2012/0059588 A1 * | 3/2012 | Inanc et al. | 702/8 |
| 2012/0059589 A1 * | 3/2012 | Chace et al. | 702/8 |
| 2012/0318968 A1 | 12/2012 | Inanc | |
| 2013/0048849 A1 * | 2/2013 | Li et al. | 250/269.8 |
| 2013/0197861 A1 * | 8/2013 | Barat et al. | 702/180 |

FOREIGN PATENT DOCUMENTS

WO  2013006073 A1  1/2013

* cited by examiner

*Primary Examiner* — David Porta
*Assistant Examiner* — Taeho Jo
(74) *Attorney, Agent, or Firm* — Mossman Kumar & Tyler PC

(57) ABSTRACT

Methods, systems and devices for estimating a parameter of interest from a gamma ray spectrum relating to a volume of matter using standard gamma ray spectra from reference samples, wherein there is at least one non-elemental characteristic that is different between the volume and at least one of the reference samples, wherein the non-elemental characteristic difference affects gamma ray interactions. Methods may include deconvolving a gamma ray spectrum obtained from the analysis volume into a plurality of elemental spectral yields, wherein deconvolution includes compensating for effects of the non-elemental characteristic difference. Methods may include using at least one compensation standard spectrum configured to compensate for the effects of the non-elemental characteristic of the at least one of the reference samples.

23 Claims, 10 Drawing Sheets

METHODS TO ENHANCE NUCLEAR SPECTROSCOPY ANALYSIS

FIELD OF THE DISCLOSURE

This disclosure generally relates to methods, devices and systems for estimating at least one parameter of interest relating to a volume of matter using nuclear radiation based measurements.

BACKGROUND OF THE DISCLOSURE

Using nuclear techniques to investigate volumes of either organic or inorganic matter is well known. For example, naturally radioactive elements are commonly found in earth formations in various proportions, depending on the type of lithology and other factors. Radioactive isotopes of potassium, uranium, and thorium are typical regularly occurring naturally radioactive elements commonly quantified in the petroleum industry.

A rigid or non-rigid conveyance device is often used to convey one or more nuclear radiation detectors into a borehole intersecting the earth formation, often as part of a tool or a set of tools. There, the detector(s) may be used to estimate radiation associated with a volume of interest of the earth formation by generating a response to the one or more types of nuclear radiation present in the near-borehole environment during measurement. This response may then be used to estimate a parameter of interest of the volume. In nuclear logging, additional radioactive isotopes may be generated by providing radiation (e.g., neutron bombardment) to the formation.

Oil well logging has been known for many years and provides an oil and gas well driller with information about the particular earth formation being drilled. One or more parameters of interest of the earth formation obtained as above may relate to hydrocarbon exploration or production. For example, the parameter of interest may provide indications of the location and extent of hydrocarbons in a given earth formation.

SUMMARY OF THE DISCLOSURE

In aspects, the present disclosure is related to estimating at least one parameter of interest of a volume using nuclear radiation.

One embodiment according to the present disclosure may include a method of removing the effects of the medium on gamma rays (GR) in an observed GR spectrum and the GR spectra from each chemical element (a standard or reference spectrum) that is a component of the observed GR spectrum in order to improve the quantification of at least one parameter of interest.

One embodiment according to the present disclosure may include a method for estimating at least one parameter of interest from a gamma ray spectrum relating to a volume of matter using standard gamma ray spectra from reference samples, wherein there is at least one non-elemental characteristic that is different between the volume and at least one of the reference samples, wherein the non-elemental characteristic difference affects gamma ray interactions. The method may include deconvolving a gamma ray spectrum obtained from the analysis volume into a plurality of elemental spectral yields, wherein deconvolution includes compensating for effects of the non-elemental characteristic difference. The parameter of interest may be the concentration of at least one chemical element in the analysis volume. The parameter of interest is a physical characteristic of the analysis volume. The method may include using at least one compensation standard spectrum configured to compensate for the effects of the non-elemental characteristic of the at least one of the reference samples. The method may include using at least one compensation standard spectrum for each reference sample of the reference samples.

Deconvolving the spectrum may include determining a best fit to the spectrum using a combination of the standard spectra and at least one compensation standard spectrum. Deconvolving the response spectrum may include using a modified response spectrum and one or more modified standard spectra. Deconvolving the response spectrum may include using at least one compensation standard spectrum. Deconvolving the response spectrum may include determining a best fit to the response spectrum using a combination of the one or more modified standard spectra and the modified response spectrum. Deconvolving the response spectrum may include using one of i) a linear; and ii) a non-linear weighted least squared error minimization technique.

The gamma ray interactions may include at least one of i) Compton scattering, ii) photoelectric effect, and iii) pair production. The non-elemental characteristic difference may be related to sample lithology. The non-elemental characteristic difference may be related to at least one of density and porosity. The response spectrum may span a continuous energy range including photo peaks at characteristic energies associated with the respective reference samples. The response spectrum may span a continuous energy range between 100 keV and 10 MeV.

The method may include obtaining the response spectrum for the volume of interest. Obtaining the response spectrum for the volume of interest may be carried out by making a gamma ray measurement using a gamma ray tool. The volume may include a portion of at least one of i) an earth formation; ii) a human body; iii) an animal body; iv) plant matter; v) an inanimate object.

Other method embodiments may include a method for deconvolution of a gamma ray response spectrum into relative spectral elemental yields. Methods may include deconvolving the response spectrum using one or more separately determined elemental standard spectra. Deconvolution may include compensating for effects on the elemental standard spectra from interactions of gamma rays with intervening matter during production of the elemental standard spectra from respective element samples.

Another embodiment according to the present disclosure may include an apparatus for estimating at least one parameter of interest from a gamma ray spectrum relating to a volume of matter using standard gamma ray spectra from reference samples, wherein there is at least one non-elemental characteristic that is different between the volume and at least one of the reference samples, wherein the non-elemental characteristic difference affects gamma ray interactions. The apparatus may include at least one processor configured to deconvolve a gamma ray spectrum obtained from the analysis volume into a plurality of elemental spectral yields, wherein deconvolution includes compensating for effects of the non-elemental characteristic difference. The at least one processor may be further configured to use at least one compensation standard spectrum configured to compensate for the effects of the non-elemental characteristic of the at least one of the reference samples. The at least one processor may be further configured to use a modified response spectrum and one or more modified standard spectra for deconvolution. The apparatus may include a gamma ray detector. The detector or the apparatus may be configured to be conveyed into a borehole intersecting an earth formation. In other embodiments, an apparatus may include a processor configured to carry out the method as described above.

Examples of the more important features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

Figure 1:
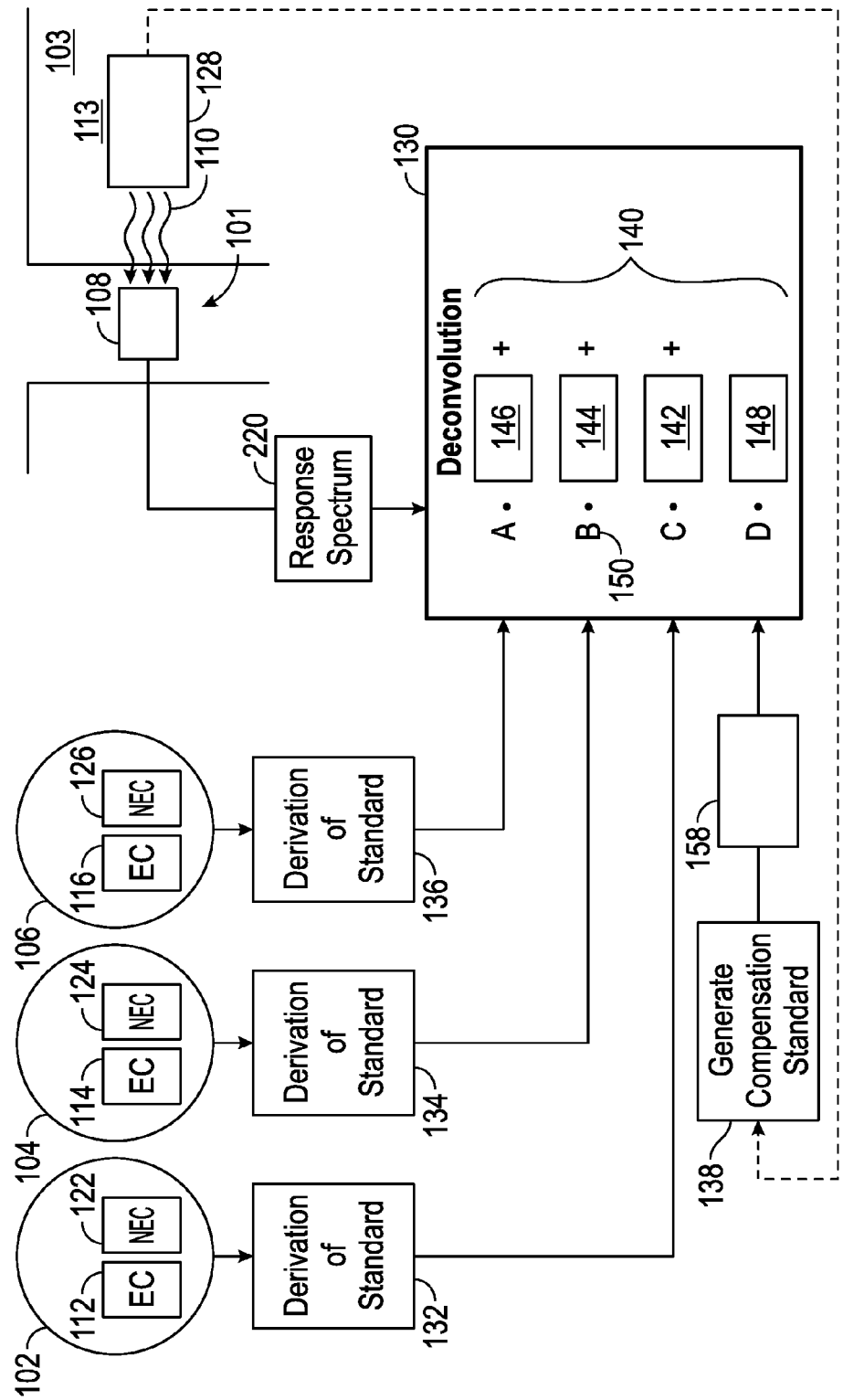
FIG. 1 illustrates a data flow diagram in accordance with embodiments of the present disclosure.

In aspects, this disclosure relates to estimating at least one parameter of interest of a volume of matter using nuclear radiation estimates. The parameter of interest may be a physical characteristic of the volume. The volume may be an earth formation, such as, for example, an earth formation surrounding a borehole, or naturally occurring materials.

The energy spectrum caused by radioactive decay of radionuclides may be used to estimate parameters of interest of an earth formation. The energy spectrum may be expressed in terms of magnitude (e.g., gamma ray counts per period of time) as a function of energy. The radioactive decay of radionuclides may produce nuclear radiation that may be detected by radiation detectors. Radionuclides may include naturally occurring radionuclides, such as potassium-40, and the uranium and thorium series, which exist in the earth formation and activated radionuclides, which may include radionuclides activated from the irradiation of nuclides with nuclear radiation.

One or more nuclear radiation detectors disposed along the downhole tool may be configured to generate a response indicative of the nuclear radiation detected. The detected nuclear radiation may include gamma rays. The detected nuclear radiation may be expressed as an energy spectrum (the "response spectrum"). See FIG. 4A. Response spectrum refers to not only the response spectrum as originally acquired, but also after filtering, corrections, or pre-processing is applied. Since the energy spectrum may include energy spectrum components from multiple radionuclides, the nuclear radiation information may be separated to identify the energy spectrum components contained with the energy spectrum.

The separate energy spectrum components may be used for estimating the concentration of at least one radionuclide in the volume of interest of the earth formation. The estimated concentration of the at least one radionuclide may be used for estimating at least one parameter of interest of the volume of interest of the earth formation. A description for some embodiments estimating the at least one parameter of interest follows below. The estimation may be performed in multiple stages, such that an earlier stage may process the information for a later stage. One of the stages may include a technique of elemental standards-based spectral decomposition (also known as a yields method).

Elemental standards-based spectral decomposition may use a combination of reference spectra, with each reference spectrum multiplied by a respective weighting coefficient. Typically a reference spectrum is included for each element of interest (e.g., an element the concentration of which is desired to be known), or for each element producing significant radiation. Each reference spectrum represents a response curve corresponding to radiation attributable to a particular sample element (e.g., uranium). Deconvolution according to the present disclosure may determine the weighting coefficients (see 150, FIG. 1) resulting in the best fit of the composite to the response spectrum. Deconvolution may be linear or non-linear, and may be carried out on the response spectrum holistically (i.e., "windowlessly"). These coefficients may be used to determine the portion of the matter of the volume constituted by the sample element. The response spectrum may be measured over a wide range of energies, resulting in improved estimation of the parameter of interest. For example, the response spectrum may span a continuous energy range including gamma ray photo peaks at characteristic energies associated with respective elements for all of the sample elements.

The standard spectra may be derived from analysis of the samples in a laboratory or on-site, which may be obtained using a variety of methods. In one example, gamma ray measurement of a sample may provide a response spectrum to be used as the reference spectrum ('standard') for that element. However, these standards also contain surplus information of other properties of the volume from which the standards have been obtained. In the case that these non-elemental characteristics of the sample volume do not closely match the non-elemental characteristics of the volume being measured, the differences can mask element information in lower amplitudes of the response spectrum. For example, elements having a low energy or present in low concentrations may be masked.

For example, comparing the instance of the reference volume to the instance of the measured volume, non-elemental characteristic differences may change the interactions of gamma rays with the matter of the volume. These interactions may include Compton scattering, photoelectric effect, and pair production. Compton scattering effects (which occur for each photo peak) may be particularly prominent in the intermediate energy range, i.e., 100 keV to 10 MeV. Because these interactions affect the response spectrum, the magnitude of the effects in the measured spectrum and in the reference spectrum is different. Errors in deconvolution can be attributed to these differences in effects. Aspects of this disclosure relate to compensating for effects of the non-elemental characteristic difference, as described above.

Figure 4A:
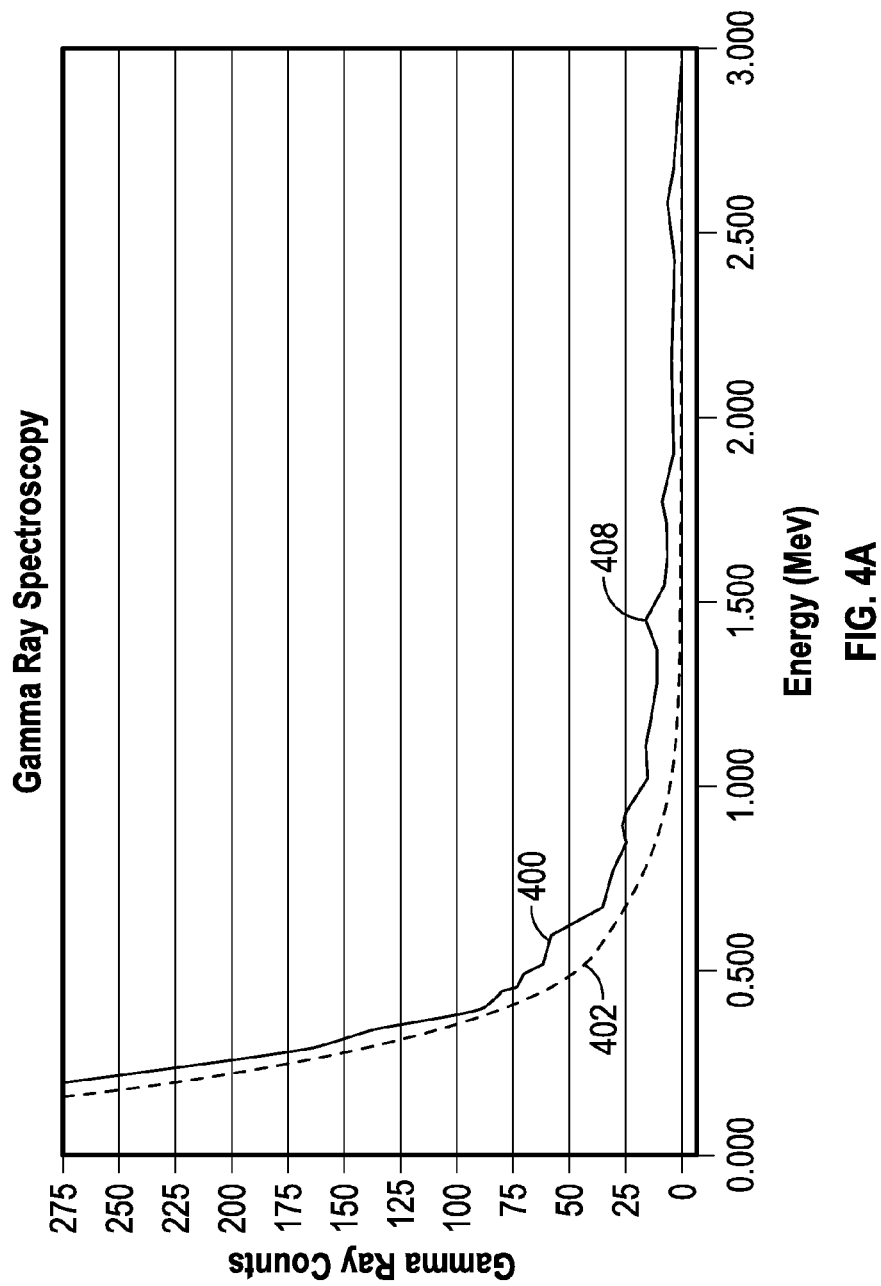
FIG. 4A-C show charts containing energy spectra estimated for a volume of interest of an earth formation.

FIG. 1 illustrates a data flow diagram in accordance with embodiments of the present disclosure. A detector assemblage 108 generates a spectrum (i.e., the detected gamma ray spectrum, or "response spectrum" 120—as shown in FIG. 4A) in response to detected gamma rays 110 in a borehole 101 intersecting an earth formation 103. The response spectrum 120 is deconvolved using a weighted composite 140 of standard gamma ray spectra 142, 144, 146 (block 130).

Each of the standard spectra 142, 144, 146 is a previously-derived spectrum from a volume of a respective reference sample 102, 104, 106. Each sample 102, 104, 106 has elemental characteristics ('EC') 112, 114, 116, such as, for example, percentage of mass or volume constituting the element, total mass of the element, and so on; and non-elemental characteristics ('NEC') 122, 124, 126, such as, for example, density, porosity, etc. Some non-elemental characteristics may be related to lithology. The volume of interest 113 also has non-elemental characteristics 128. Some non-elemental characteristics may be difficult or impractical to directly measure in the sample, the volume of interest, or both. Derivation of the respective standards 142, 144, 146 (block 132, 134, 136) as in the case of natural radiation may be carried out through measurements at facilities such as the API Gamma Ray-Neutron Facility in Houston, Tex. using the various test pits that contain known amounts of K, Th, and U, for example.

The weighted composite 140 further includes a compensation standard spectrum 148. The compensation standard spectrum 148 is an artificial standard that represents the response to the combined effects of the difference between the non-elemental characteristics 122, 124, 126 of the reference samples 102, 104, 106 represented by the standard spectra 142, 144, 146 and the non-elemental characteristics 128 of the volume of interest 113. Deconvolution may be carried out using this additional "standard" along with the other conventional standards to solve the measured spectrum.

Deconvolution may be any process to extract assumed components of a complex quantity. Deconvolution may be carried out using either a linear or non-linear weighted least squared error minimization technique, Monte Carlo techniques, simplex, neural network, and so on.

The compensation standard spectrum 148 is not pre-calibrated. Instead, it may be configured specifically for each deconvolution. Thus, the compensation standard spectrum 148 may be determined in dependence upon the response spectrum to be deconvolved, or portions thereof (e.g., magnitude of photo peaks at characteristic energies associated with a reference sample), or other variable parameters that are not known with a desired certainty before the response is obtained.

Generating the compensation standard spectrum 148 (block 138) may be carried out by testing that all values of the response spectrum over the range of interest are positive. Any non-positive values can be made positive by linear interpolation between positive values. Fitting a straight line to natural log of values is equivalent to fitting an exponential function to the original response spectrum. The straight line that lies on or below all points of the spectrum contains exactly two points of the response spectrum and lies below all of the other points. An automated test of all two-point combinations will identify at least one line that does not lie above any point of the observed spectrum. Any of the straight lines on the log plot that accounts for the majority of the non-elemental characteristics ('NEC') is finally transformed back to an exponential curve and is defined as the compensation standard spectrum. The compensation standard spectrum 148 may be non-negative along the whole energy range. In some instances, the compensation standard spectrum 148 may be generated using a function $$\alpha e^{-kx}$$

wherein $\alpha$ is an amplitude parameter, x is gamma ray energy, and k is a decay parameter. Function parameters may be determined through numerical or graphical analysis of the response spectrum. For example, $\alpha$ may be chosen as a percentage of the greatest peak amplitude in the response spectrum, a percentage of the greatest peak amplitude outside of photo peaks at characteristic energies associated with a reference sample, and so on. Parameter k may be any value that gives an exponential curve all of whose values lie below the response spectrum and accounts for the majority of the non-elemental characteristics.

In some applications, additional elemental characteristics may be associated with borehole 101. For example, potassium may be found in borehole fluids in some environments. These elemental characteristics may be experimentally determined according to methods in the prior art and removed from the response spectrum in pre-processing or post processing. In some embodiments, the known value of these elemental characteristics may be used by introducing additional values for deconvolution as described above.

Other implementations may include at least one compensation standard spectrum for each reference sample. Each compensation standard spectrum may be determined in dependence upon the particular reference sample elements used. In some aspects, interaction effects are removed from each of the standard spectra individually, resulting in a set of background-corrected ("clean") standard spectra. The effects may be removed using a particular compensation standard spectrum for each standard spectrum.

Figure 2:
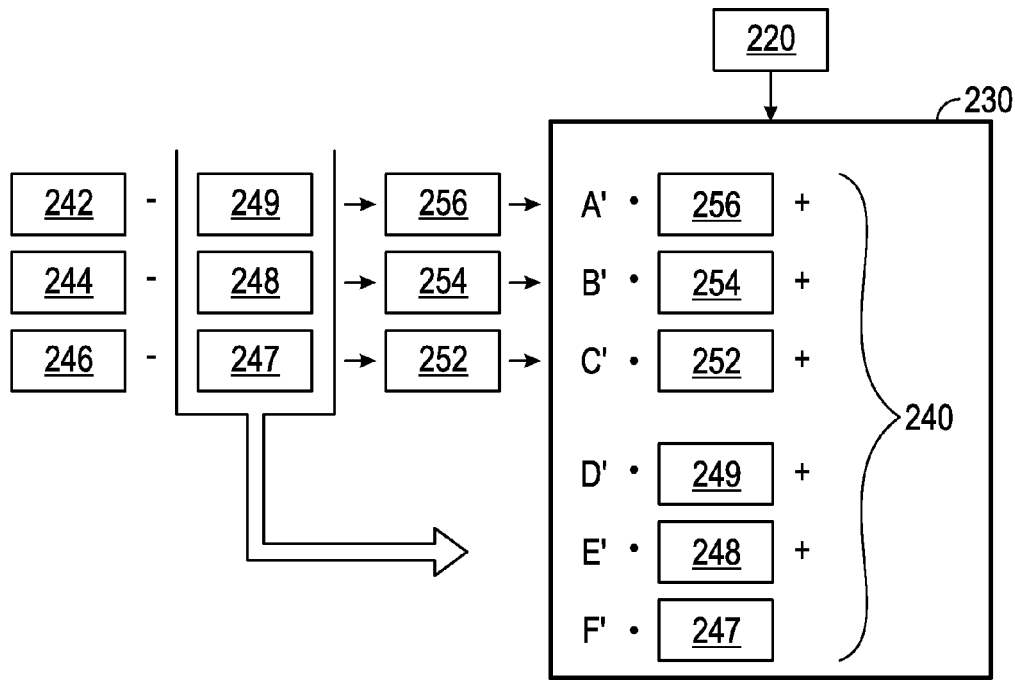
FIG. 2 illustrates a data flow diagram in accordance with other embodiments of the present disclosure.

FIG. 2 illustrates a data flow diagram in accordance with other embodiments of the present disclosure. The response spectrum 220 may be deconvolved 230 using a weighted composite 240 of multiple compensation standard spectra 247, 248, 249 and modified ("clean") standard spectra 252, 254, 256. Each of compensation standard spectra 247, 248, 249 is an artificial standard that represents the response to the respective interaction effects from non-elemental characteristics 222, 224, 226 for each particular sample 202, 204, 206. The standard spectra 242, 244, 246 are modified by removing from each spectrum all or a portion of the corresponding compensation standard spectrum 247, 248, 249 to form the respective modified standard spectrum 252, 254, 256. It may be desirable that the respective modified standard spectrum 252, 254, 256 be non-negative along the energy range.

Figure 3:
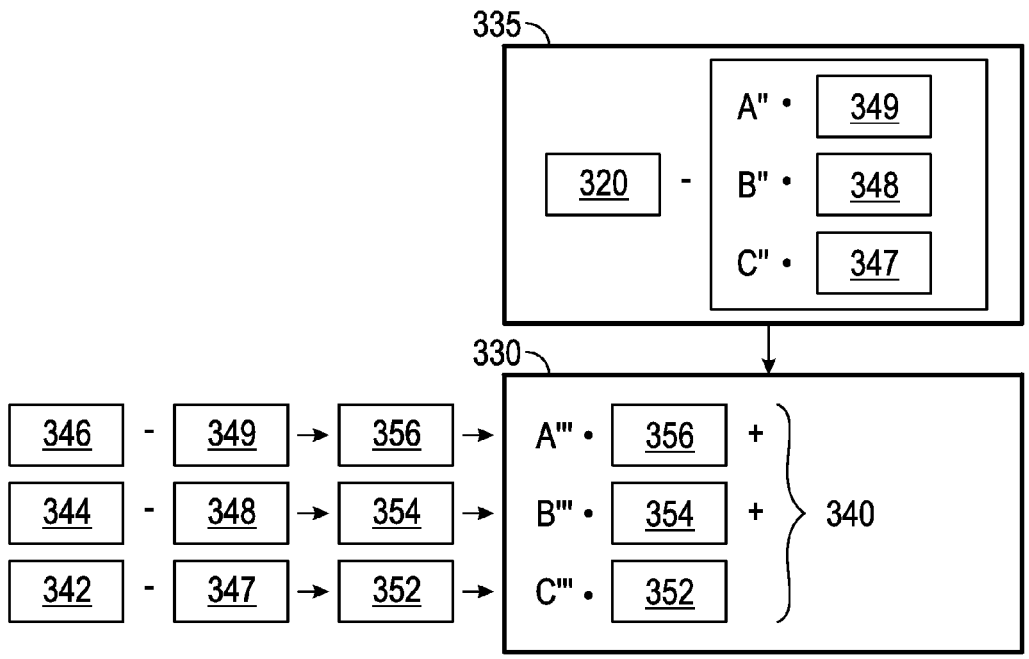
FIG. 3 illustrates a data flow diagram in accordance with other embodiments of the present disclosure.

In other aspects, it may be desirable to deconvolve a background corrected ("clean") response spectrum using "clean" standards. FIG. 3 illustrates a data flow diagram in accordance with other embodiments of the present disclosure. The response spectrum 320 may be modified 335 and then deconvolved 330 using a weighted composite 340 of modified standard spectra 352, 354, 356. Modified standard spectra 352, 354, 356 are created by removing from each standard spectra 342, 344, 346 all or a portion of the corresponding compensation standard spectrum 347, 348, 349. As described above, each of compensation standard spectra 347, 348, 349 may be an artificial standard that represents the response to the respective interaction effects from non-elemental characteristics 322, 324, 326 for each particular sample 302, 304, 306. Modifying the response spectrum 320 (block 335) may be carried out by removing a combination of compensation standard spectra 347, 348, 349 from the response spectrum in amounts corresponding to weighting coefficients (A"-C") from a first pass using other deconvolution methods, including conventional deconvolution using only standard spectra.

The teachings of the present disclosure may be applied in a variety of situations. It should be noted that the volume of interest may be a portion of an earth formation such as the near-borehole environment or a extracted sample; a human body; an animal body; plant matter; or an inanimate object.

Therefore, the design of detector assemblage 108 will vary according to the particular environment to which it is applied. For subsurface applications, detector assemblage 108 may be part of a natural or induced gamma ray tool. One such gamma ray tool may be used in connection with down-hole logging in a borehole of an earth formation. Other gamma ray tools may be used as part of a security scanning station for entrance to a secured area. Other gamma ray tools may be used in conjunction with a human or animal patient, and may be specifically adapted to accommodate the patient during detection.

Figure 4B:
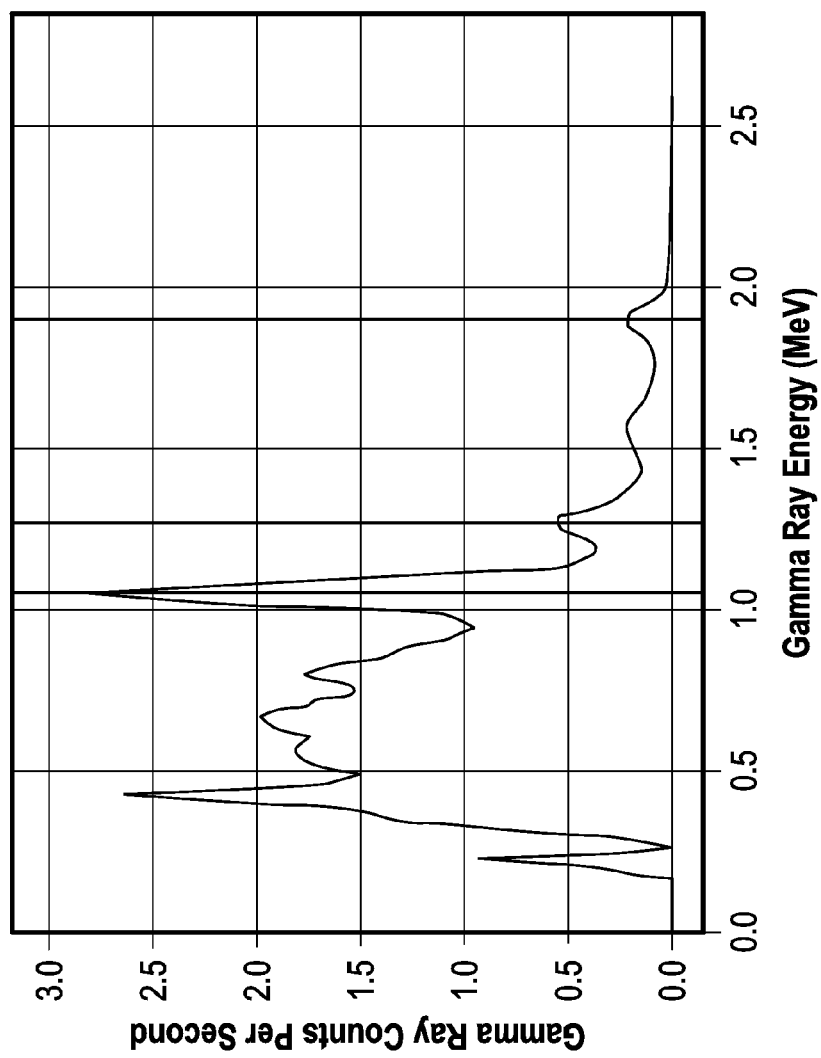
Figure 4C:
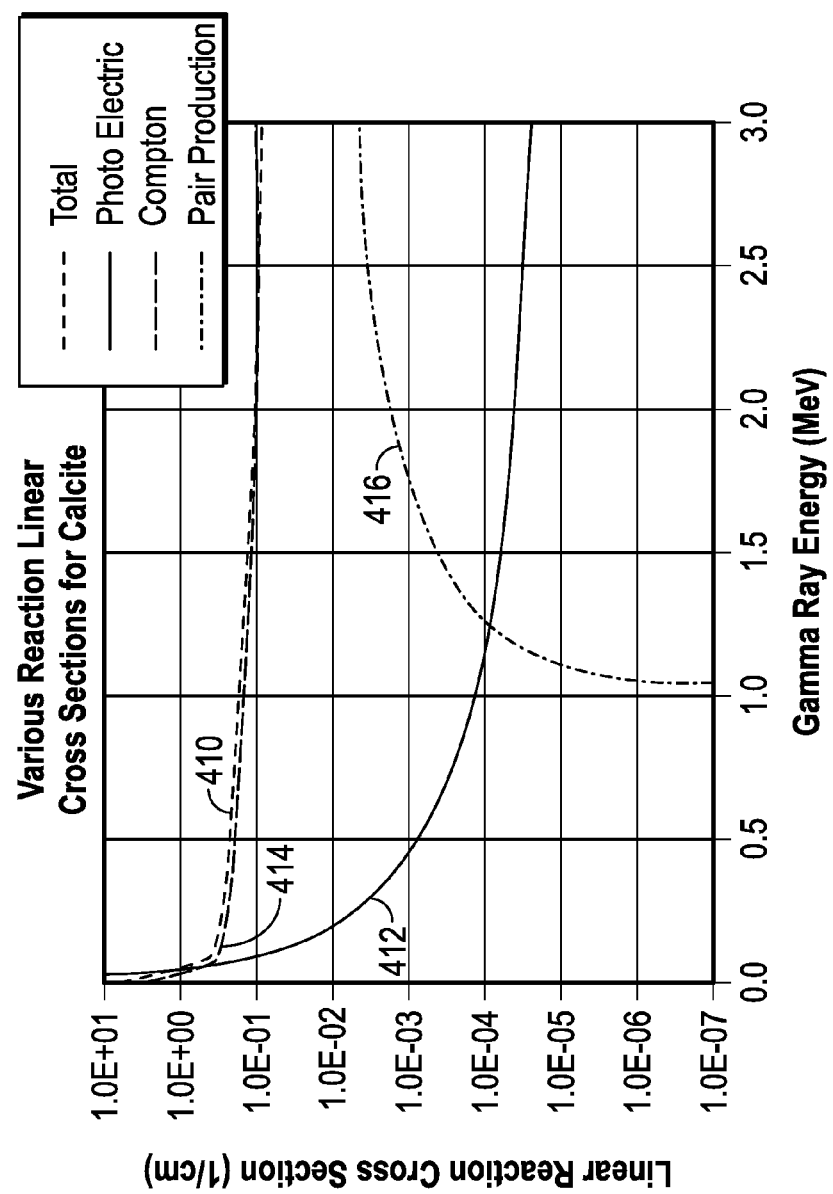

FIG. 4A-C show charts containing energy spectra for a volume of interest of an earth formation. FIG. 4A illustrates an example uncorrected response spectrum 400 and an example compensation spectrum 402. FIG. 4B illustrates a corrected response spectrum 404. The recorded energy spectrum 400 may include multiple energy spectrum components, such that the sum of the energy spectrum components may be equal to the energy spectrum 400. Energy spectrum 400 may be expressed as follows:

$$E_T = \alpha_1 E_1 + \alpha_2 E_2 + \ldots \alpha_n E_n \quad (1)$$

where $E_T$ may be the energy spectrum 400, $E_{1 \ldots n}$ may represent energy spectrum components for a plurality of radionuclides, and $\alpha_{1 \ldots n}$ may represent the proportions of the radionuclides in the medium. Energy spectrum 400 may include energy peak 408.

FIG. 4C illustrates linear reaction cross section according to gamma ray energy for various reactions in calcite. Total energy 410 includes constituent energies for photoelectric reactions 412, Compton scattering 414, and pair production 416.

Figure 5:
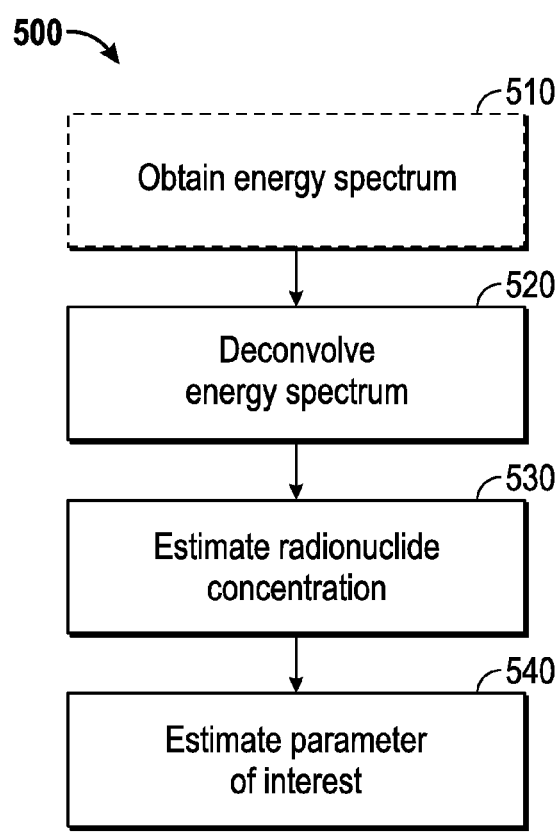
FIG. 5 shows a flow chart for estimating a parameter of interest of the earth formation according to embodiments of the present disclosure.

FIG. 5 shows a flow chart 500 for estimating a parameter of interest of the earth formation according to embodiments of the present disclosure. In optional step 510, an energy spectrum for a volume of interest of the earth formation 103 may be obtained. The energy spectrum may include gamma ray spectra. In step 520, the energy spectrum may be deconvolved using spectral decomposition into at least one energy spectrum component according to the methods disclosed herein using at least one processor. The spectral decomposition method may be based on using elemental standards. Elemental standards may include unique energy spectra specific to one radionuclide that may be present in the earth formation. The combination of such unique spectra may form the energy spectra recorded by the detectors.

Such elemental standards and one or more compensation standards may be superimposed at various levels and the resulting spectrum may be compared to the recorded spectrum. The levels that provide the least error may be assumed to represent the actual concentration levels in the formation.

In step 530, a concentration of at least one radionuclide may be estimated with the at least one processor according to known methods using the results of spectral decomposition.

In step 540, at least one parameter of interest of the volume of interest of the earth formation 103 may be estimated using the at least one radionuclide concentration. The at least one parameter of interest may include, but is not limited to, one or more of: composition, bulk density, and mineralogy.

In some embodiments, the energy spectrum may be obtained by conveying at least one radiation detector (see 710, FIG. 7) into a borehole 101 in the earth formation 103; irradiating the volume of interest using a neutron source (see 740, FIG. 7); and generating a signal indicative of the energy spectrum using the at least one radiation detector (710). The at least one radiation detector may be configured to generate a signal in response to gamma radiation. In some embodiments, natural gamma ray emissions may be used instead of an active radiation source. In some embodiments, a gamma ray source (not shown) may be used as an alternative to a neutron source.

Figure 6:
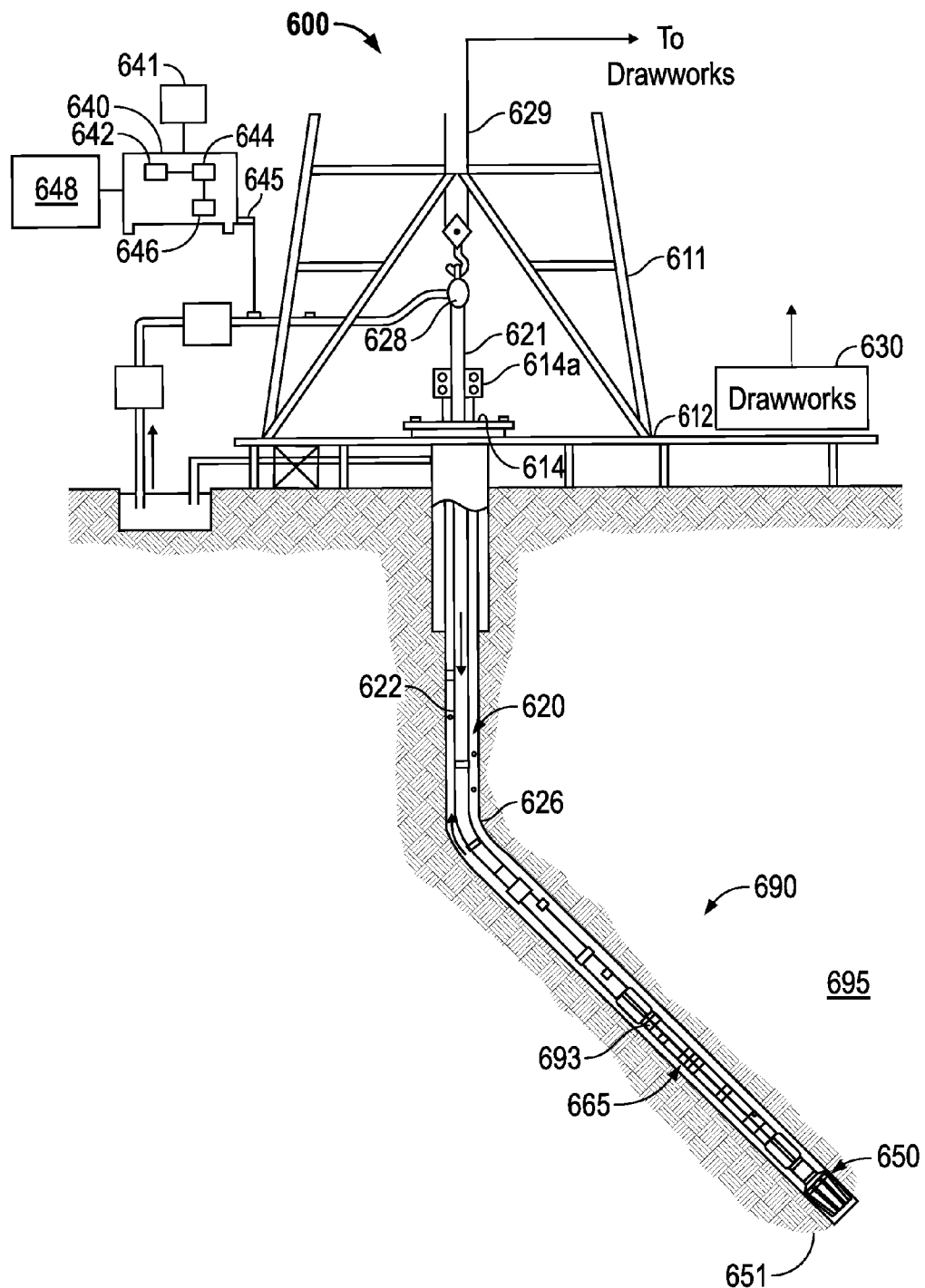
FIG. 6 is a schematic diagram of an exemplary drilling system according to one embodiment of the disclosure.

FIG. 6 is a schematic diagram of an exemplary drilling system 100 that includes a drill string having a drilling assembly attached to its bottom end that includes a steering unit according to one embodiment of the disclosure. FIG. 6 shows a drill string 620 that includes a drilling assembly or bottom-hole assembly (BHA) 690 conveyed in a borehole 626. The drilling system 600 includes a conventional derrick 611 erected on a platform or floor 612 which supports a rotary table 614 that is rotated by a prime mover, such as an electric motor (not shown), at a desired rotational speed. A tubing (such as jointed drill pipe) 622, having the drilling assembly 690, attached at its bottom end extends from the surface to the bottom 651 of the borehole 626. A drill bit 650, attached to drilling assembly 690, disintegrates the geological formations when it is rotated to drill the borehole 626. The drill string 620 may be rotated by a top drive (not shown) instead of by the prime mover and the rotary table 614. Alternatively, a coiled-tubing may be used as the tubing 622. A tubing injector 614a may be used to convey the coiled-tubing having the drilling assembly attached to its bottom end.

The drilling system 600 can include one or more processors at a suitable location such as a downhole processor 693 on the BHA 690 or incorporated in surface control unit 640. Either processor may process data relating to the drilling operations, data from the sensors and devices on the surface, data from downhole, and may control one or more operations of the downhole and surface devices. The surface control unit 640 receives signals from downhole sensors and devices and processes such signals according to programmed instructions provided to the surface control unit 640. The data may be transmitted in analog or digital form. The surface control unit 640 may be a computer-based unit that may include a processor 642 (such as a microprocessor), a storage device 644, such as a solid-state memory, tape or hard disc, and one or more computer programs 646 in the storage device 644 that are accessible to the processor 642 for executing instructions contained in such programs.

The BHA 690 may also contain formation evaluation sensors or devices (also referred to as measurement-while-drilling ("MWD") or logging-while-drilling ("LWD") sensors) determining resistivity, density, porosity, permeability, acoustic properties, nuclear-magnetic resonance properties, formation pressures, properties or characteristics of the fluids downhole and other desired properties of the formation 695 surrounding the BHA 690. Such sensors are generally known in the art and for convenience are generally denoted herein by numeral 665. The surface processor 642 can process the surface measured data, along with the data transmitted from the downhole processor, to evaluate formation lithology. A point of novelty of the system illustrated in FIG. 6 is that the surface processor 642 and/or the downhole processor 693 are configured to perform certain methods (discussed below) that are not in the prior art.

Figure 7:
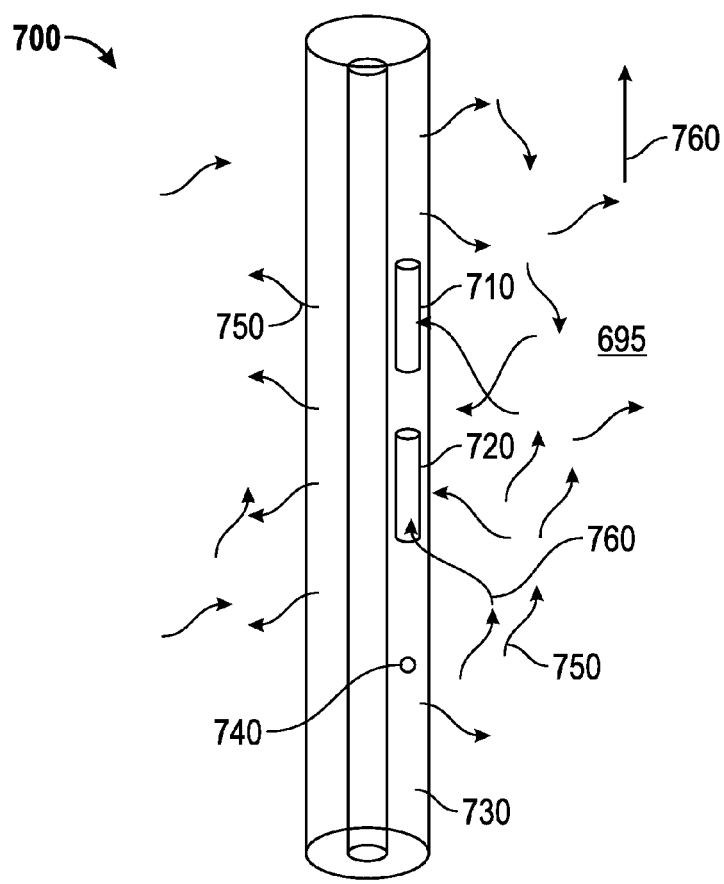
FIG. 7 shows a nuclear detection module according to embodiments of the present disclosure.

FIG. 7 shows a nuclear detection module 700 that may be incorporated in BHA 190, such as along with evaluation sensors 665 according to one embodiment of the present disclosure. The nuclear detection module 700 may include one or more sensors 710, 720 configured to detect nuclear radiation disposed along a drill string 730, such as a scintillation detector. The one or more nuclear radiation sensors 710, 720 may be spaced at different distances along the drill string 730 apart from an optional neutron source 740. When neutron source 740 is turned on, emitted neutrons may generate radionuclides in the drill string 730. The drill string 730 may then serve as a gamma radiation source. When the neutron source 740 is turned off and after delayed neutron emissions have stopped, the drill string 730 may still be emitting nuclear radiation 750 into the earth formation 195. The interaction with the nuclear radiation 750 and the earth formation 195 may result in nuclear radiation emissions 760 from the formation. Nuclear radiation emissions 760 may be the result of gamma ray scattering and/or absorption/emission by the earth formation 195. Detectors 710, 720 may receive nuclear radiation emissions 750 from the drill string 730 and nuclear radiation emissions 760 from the earth formation 695. Detectors 710, 720 may be scintillation detectors comprising a photo-responsive component (e.g., a photomultiplier) supplying responses to a pulse height analyzer ('PHA'). The PHA may in turn provide digital output to memory or processors of the present disclosure. In some embodiments, natural gamma ray emissions may be used instead of an active radiation source. A gamma ray source (not shown) may be used as an alternative to a neutron source. Some embodiments may include removing an energy spectrum component due to gamma rays emitted by radionuclides that have built up in the drill string 730.

Figure 8:
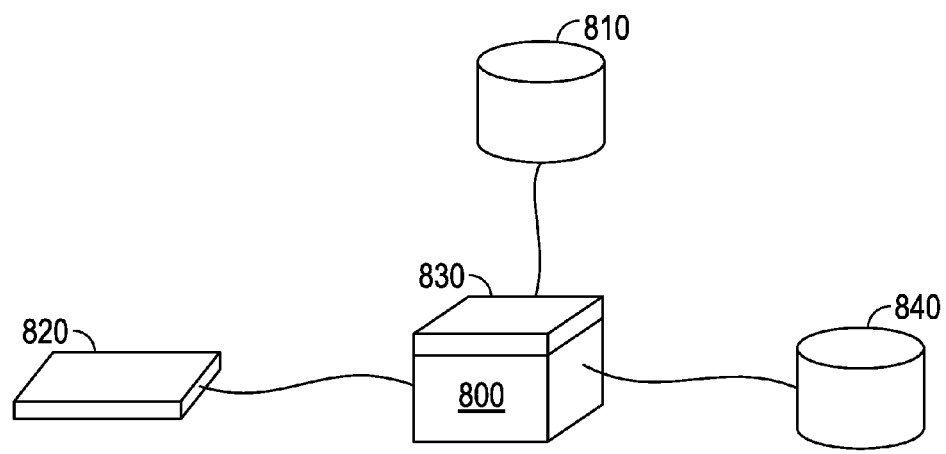
FIG. 8 shows a schematic of a hardware embodiment according to embodiments of the present disclosure.

As shown in FIG. 8, certain embodiments of the present disclosure may be implemented with a hardware environment that includes an information processor 800, a information storage medium 810, an input device 820, processor memory 830, and may include peripheral information storage medium 840. The hardware environment may be downhole, at the surface, and/or at a remote location. Moreover, the several components of the hardware environment may be distributed among those locations. The input device 820 may be any information reader or user input device, such as data card reader, keyboard, USB port, etc. The information storage medium 810 stores information provided by the detectors. Information storage medium 810 may be any standard computer information storage device, such as a ROM, USB drive, memory stick, hard disk, removable RAM, EPROMs, EAROMs, EEPROM, flash memories, and optical disks or other commonly used memory storage system known to one of ordinary skill in the art including Internet based storage. Information storage medium 810 stores a program that when executed causes information processor 800 to execute the disclosed method. Information storage medium 810 may also store the formation information provided by the user, or the formation information may be stored in a peripheral information storage medium 840, which may be any standard computer information storage device, such as a USB drive, memory stick, hard disk, removable RAM, or other commonly used memory storage system known to one of ordinary skill in the art including Internet based storage. Information processor 800 may be any form of computer or mathematical processing hardware, including Internet based hardware. When the program is loaded from information storage medium 810 into processor memory 830 (e.g. computer RAM), the program, when executed, causes information processor 800 to retrieve detector information from either information storage medium 810 or peripheral information storage medium 840 and process the information to estimate a parameter of interest. Information processor 800 may be located on the surface and/or downhole.

While a drill string 620 is shown as a conveyance system for sensors 665, it should be understood that embodiments of the present disclosure may be used in connection with tools conveyed via rigid (e.g. jointed tubular or coiled tubing) as well as non-rigid (e.g. wireline, slickline, e-line, etc.) conveyance systems.

Figure 9:
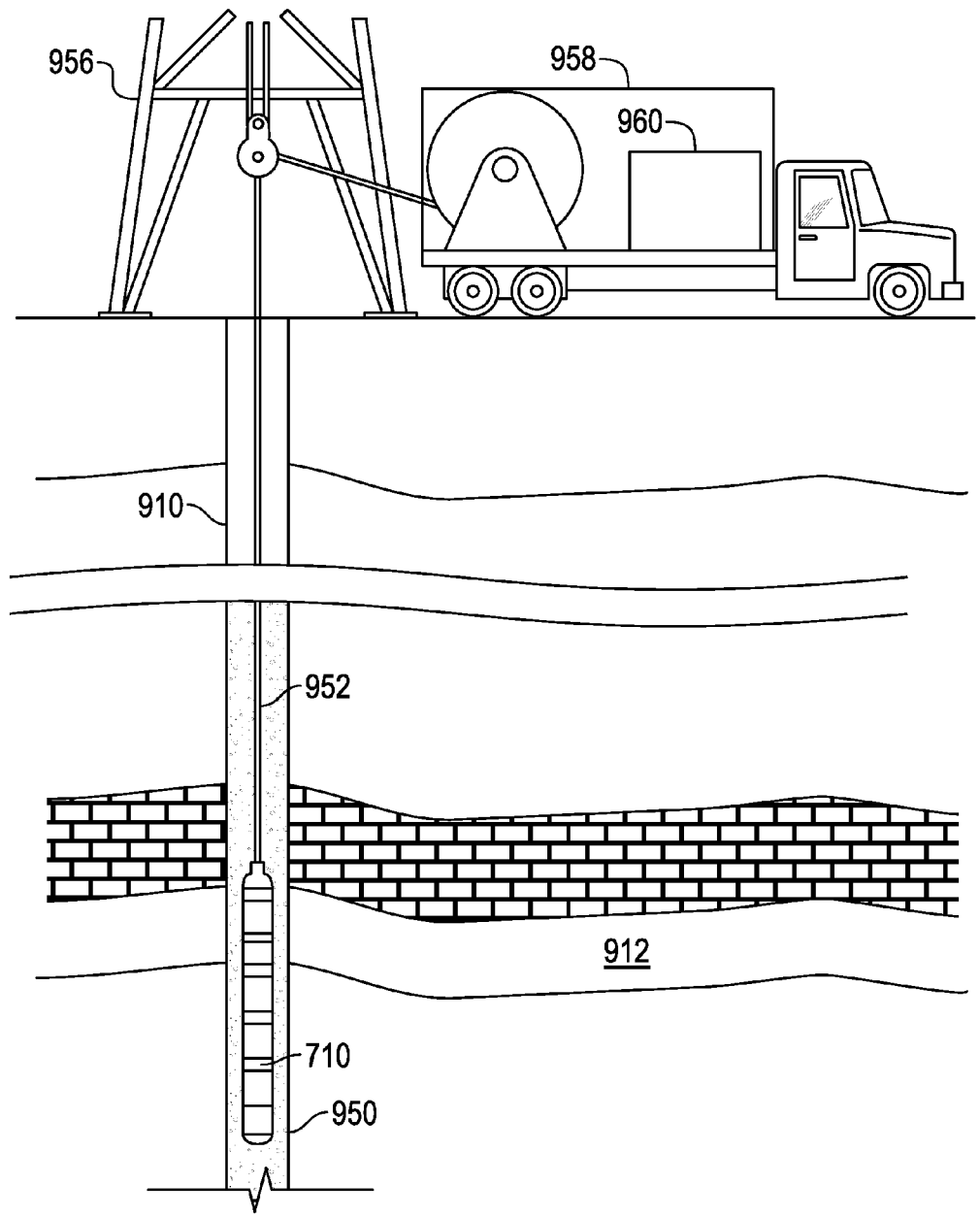
FIG. 9 is a schematic diagram of an exemplary borehole system according to one embodiment of the disclosure.

Non-limiting and illustrative uses will be described with reference to FIG. 9, which schematically represents a cross-section of the formation 912 intersected by a drilled wellbore 910. A formation evaluation tool 950 may be suspended within the wellbore 910 by a carrier 952. The carrier 952 may be a data-conducting wireline supported by a derrick 956. A control panel 960 communicates with the tool 950 through the carrier 952. Personnel my use the control panel 960 to transmit electrical power, data/command signals, and to control operation of the tool 950. The tool 950 may include a detector 710 as described above. Generally speaking, the detector 710 may be any device that generates information in response to a radiation. The information may be a value, a relative value, a change in a value, etc. Operation of the tool may correspond to that of the example embodiments illustrated above.

The term "carrier" as used herein means any device, device component, combination of devices, media and/or member that may be used to convey, house, support or otherwise facilitate the use of another device, device component, combination of devices, media and/or member. Illustrative "carriers" include wirelines, wireline sondes, slickline sondes, e-lines, jointed drill pipe, coiled tubing, wired pipe, casing, liners, drop tools, etc.

Herein, "information" may include raw data, processed data, analog signals, and digital signals. Herein, the term "nuclear radiation" includes particle and non-particle radiation emitted by atomic nuclei during nuclear processes (such as radioactive decay and/or nuclear bombardment), which may include, but are not limited to, photons from neutron inelastic scattering and from neutron thermal capture reactions, neutrons, electrons, alpha particles, beta particles, and pair production photons. The term "activated" relates to the conversion of a normally stable nuclide into a radionuclide through a nuclear process, such as, but not limited to, neutron-proton (n,p) reactions and radiative capture (n,γ). For example, nuclide iron-56 may be activated through a neutron-proton reaction to form radionuclide manganese-56. Nuclides that may be activated in the earth formation may include, but are not limited to, one or more of: aluminum, calcium, chlorine, iron, gadolinium, hydrogen, magnesium, manganese, sodium, sulfur, silicon, titanium, carbon, potassium, and oxygen.

Elemental spectral yield may be described as a proportion of spectrum component interpreted as belonging to one of the sample elements as deconvolved from the measured spectrum. An interaction may be described as an event causing a change in energy of radiation (e.g., a gamma ray) prior to measurement of the radiation. "Significant radiation" may be any measurable radiation which is a component of the response spectrum.

While the foregoing disclosure is directed to the one mode embodiments of the disclosure, various modifications will be apparent to those skilled in the art. It is intended that all variations be embraced by the foregoing disclosure.

What is claimed is:

1. A method for estimating at least one parameter of interest from a gamma ray spectrum relating to a volume of matter using standard gamma ray spectra from reference samples, wherein there is at least one non-elemental characteristic that is different between the volume and at least one of the reference samples, wherein the non-elemental characteristic difference affects gamma ray interactions, the method comprising:

deconvolving a gamma ray spectrum obtained from the analysis volume into a plurality of elemental spectral yields, wherein deconvolution includes compensating for effects of the non-elemental characteristic difference.

2. The method of claim 1, wherein the parameter of interest is the concentration of at least one chemical element in the analysis volume.

3. The method of claim 1, wherein the parameter of interest is a physical characteristic of the analysis volume.

4. The method of claim 1, comprising using at least one compensation standard spectrum configured to compensate for the effects of the non-elemental characteristic of the at least one of the reference samples.

5. The method of claim 1, comprising using at least one compensation standard spectrum for each reference sample of the reference samples.

6. The method of claim 1, wherein deconvolving the spectrum further comprises determining a best fit to the spectrum using a combination of the standard spectra and at least one compensation standard spectrum.

7. The method of claim 1, wherein deconvolving the response spectrum further comprises using a modified response spectrum and one or more modified standard spectra.

8. The method of claim 7, wherein deconvolving the response spectrum further comprises using at least one compensation standard spectrum.

9. The method of claim 7, wherein deconvolving the response spectrum further comprises determining a best fit to the response spectrum using a combination of the one or more modified standard spectra and the modified response spectrum.

10. The method of claim 1, wherein deconvolving the response spectrum further comprises using one of i) a linear; and ii) a non-linear weighted least squared error minimization technique.

11. The method of claim 1, wherein the gamma ray interactions include at least one of i) Compton scattering, ii) photoelectric effect, and iii) pair production.

12. The method of claim 1, wherein the non-elemental characteristic difference is related to sample lithology.

13. The method of claim 1, wherein the non-elemental characteristic difference is related to at least one of density and porosity.

14. The method of claim 1, wherein the response spectrum spans a continuous energy range including photo peaks at characteristic energies associated with the respective reference samples.

15. The method of claim 1, wherein the response spectrum spans a continuous energy range between 100 keV and 10 MeV.

16. The method of claim 1, further comprising obtaining the response spectrum for the volume of interest.

17. The method of claim 16, wherein obtaining the response spectrum for the volume of interest further comprises making a gamma ray measurement using a gamma ray tool.

18. The method of claim 17, wherein the interactions include at least one of i) Compton scattering, ii) photoelectric effect, and iii) pair production.

19. The method of claim 18, wherein the parameter of interest relates to elemental composition of the volume.

20. The method of claim 19, wherein the volume comprises a portion of at least one of i) an earth formation; ii) a human body; iii) an animal body; iv) plant matter; v) an inanimate object.

21. An apparatus for estimating at least one parameter of interest from a gamma ray spectrum relating to a volume of matter using standard gamma ray spectra from reference samples, wherein there is at least one non-elemental characteristic that is different between the volume and at least one of the reference samples, wherein the non-elemental
    characteristic difference affects gamma ray interactions, the apparatus comprising:
    at least one processor configured to:
    deconvolve a gamma ray spectrum obtained from the analysis volume into a plurality of elemental spectral yields, wherein deconvolution includes compensating for effects of the non-elemental characteristic difference.

22. The apparatus of claim 21, wherein the at least one processor is further configured to use at least one compensation standard spectrum configured to compensate for the effects of the non-elemental characteristic of the at least one of the reference samples.

23. The apparatus of claim 21, wherein the at least one processor is further configured to use a modified response spectrum and one or more modified standard spectra for deconvolution.

* * * * *